United States Patent
Yang et al.

(10) Patent No.: US 7,982,833 B2
(45) Date of Patent: Jul. 19, 2011

(54) TRANSFLECTIVE LIQUID CRYSTAL DISPLAY PANEL HAVING A PLURALITY OF APERTURES WITH A SPECIFIC RATIO OF APERTURE WIDTH TO APERTURE INTERVAL

(75) Inventors: Tun-chun Yang, Hsin-Chu (TW); Seok-lyul Lee, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 288 days.

(21) Appl. No.: 12/177,626

(22) Filed: Jul. 22, 2008

(65) Prior Publication Data

US 2009/0103026 A1    Apr. 23, 2009

(30) Foreign Application Priority Data

Oct. 19, 2007  (TW) ................................ 96139362 A

(51) Int. Cl.
*G02F 1/1335* (2006.01)
*G02F 1/1343* (2006.01)
(52) U.S. Cl. ........................................ 349/114; 349/139
(58) Field of Classification Search .................. 349/114, 349/139, 147, 41, 116
See application file for complete search history.

(56) References Cited

U.S. PATENT DOCUMENTS

| | | | |
|---|---|---|---|
| 6,100,947 A | 8/2000 | Katayama | |
| 7,015,997 B2 | 3/2006 | Choi et al. | |
| 7,133,087 B2 | 11/2006 | Kim | |
| 2003/0202139 A1* | 10/2003 | Choi et al. | 349/113 |
| 2006/0215086 A1 | 9/2006 | Kurasawa | |
| 2006/0250551 A1 | 11/2006 | Kim | |
| 2007/0024789 A1 | 2/2007 | Itou et al. | |
| 2007/0182901 A1* | 8/2007 | Wang et al. | 349/129 |

FOREIGN PATENT DOCUMENTS

JP          2006276112          10/2006

* cited by examiner

*Primary Examiner* — David Nelms
*Assistant Examiner* — Paul C Lee
(74) *Attorney, Agent, or Firm* — Kirton & McConkie; Evan R. Witt

(57) ABSTRACT

The present invention discloses a transflective liquid crystal display panel, which includes a first substrate, a second substrate and a liquid crystal layer sandwiched between the first and second substrates, so as to constitute a plurality of pixels each divided into a transmission region and a reflective region. Within the reflective region, a first common electrode layer formed on the first substrate corresponds to both of a second common electrode layer and a pixel electrode layer formed on the second substrate, wherein the pixel electrode layer is exposed from a plurality of apertures formed on the second common electrode layer. This varies distribution of the electric lines so as to control tilts of the liquid crystals in the reflective region. By the tilts, a total retardation change value achieved in the reflective region can gradually reach consistent with a total retardation change value achieved in the transmission region. It means that transmittances of both regions can reach consistence with each other under the same driving voltage.

24 Claims, 16 Drawing Sheets

TRANSFLECTIVE LIQUID CRYSTAL DISPLAY PANEL HAVING A PLURALITY OF APERTURES WITH A SPECIFIC RATIO OF APERTURE WIDTH TO APERTURE INTERVAL

BACKGROUND OF INVENTION

1. Field of the Invention

The present invention relates to a transflective liquid crystal display panel and more particularly in a transflective liquid crystal display panel which can render consistence of the transmittances on both transmission region and reflective region thereof under the same driving voltage.

2. Description of the Prior Art

As known, conventional thin film transistor (TFT) liquid crystal display (LCD) panel scheme includes opposite upper and lower substrates and a liquid crystal (LC) layer which is constructed by sealing a number of liquid crystals molecules between the upper and lower substrates. The upper substrate is equipped with color filter and common electrode thereon. With a pixel electrode and a thin film transistor for each corresponding pixel, the lower substrate is equipped as a TFT array substrate. By applying a driving voltage on the thin film transistors of the lower substrate, an electric field is induced between the common and pixel electrodes to control direction or tilt change of the liquid crystal molecules so as to affect light transiting direction. For example, when relative low and high voltages are respectively applied on the common and pixel electrodes of the upper and lower substrates, the electric field lines induced from the pixel electrode would distribute over the LC layer. The distributing directions of the electric field lines could vary tilt angles of the liquid crystal molecules allocated within the LC layer. In cases the direction-varied LC molecules would be always kept parallel or perpendicular to the electric field lines, depending upon whether a dielectric constant anisotropy ($\Delta \in$) of the LC molecule is positive or negative. To broaden visual-angle boundary of the panel, various kinds of commonly-used liquid crystal includes, for example, Twisted Nematic (TN) type, a Vertical Alignment (VA) type and an In-Plane-Switching (IPS) type. Most of the VA type LC is a negative LC molecule with an elongated ellipsoidal shape. A longwise axis and a short axis of the ellipsoid-shaped LC are respectively applied to get different refractive characteristics for displaying different grays. For example, when none of the driving voltage is applied, the VA type LC is kept perpendicular to the upper and lower substrates to bar pass of light through the LC. This causes that the frame of the display panel appears black image. On the contrary, when the driving voltage is applied, different electric field directions are induced in light of whether the common and pixel electrodes are allocated on the same substrate or not. Because the induced electric field lines should be perpendicular to the longwise axis of the LC molecules, the different tilt and directions of the LC molecules would be determined (i.e. the longwise axis becomes parallel to the substrate) and thereby permit pass of light through the LC.

Beside a Multi-Domain Vertical Alignment (MVA) type LC is disclosed presently, which makes a technological improvement on the basis of the VA type LC so as to broaden visual-angle boundary of the panel. The improvement is to additionally form one or more than one protrusion (or called 'bump') on the electrode of the upper and/or lower substrate of the panel. When none of the driving voltage is applied, the longwise axis of the LC distributed within the LC layer is kept perpendicular to the upper and lower substrates. Each pixel is constituted by numbers of corresponding vertical LC molecules, except that the other LC molecules adjacent around the protrusion suffer local effect to tilt toward a specific direction or angle, rather than a vertical direction. As long as the driving voltage is applied, several inclines formed with the protrusion can influence the adjacent LC molecules to tilt toward different directions (such as opposite or complementary directions), as dividing each pixel into different displaying domains, such that the different-directional LC molecules distributed in the different domains can be complemented with each other to broader visual angle bound.

It notes that after the ray pass through LC molecules between the upper and lower substrates, it commonly invokes appearance of two kinds of refractive lights, one of which is Ordinary Ray defined that a light wave having a light axis perpendicular to an electric field component has an ordinary refractive index ($n_o$); the other is Extraordinary Ray defined that a light wave having a light axis perpendicular to an electric field component has an extraordinary refractive index ($n_e$). A common LC molecule has both of the refractive indexes ($n_o$), ($n_e$). A difference between both of the ordinary and extraordinary refractive indexes ($n_o$), ($n_e$) is defined as a refraction change value ($\Delta n$) of birefringence. Due to occurrence of a speed difference between the ordinary and extraordinary rays during passing through LC molecule, a phase retardation phenomenon appears between the ordinary and extraordinary rays, wherein a phase retardation of the whole LC layer can be represented by a total retardation change value which is defined as a product of the refraction change value multiplying a cell gap value ($\Delta n \times d$).

Nevertheless, distributing direction of the electric field lines can be varied by a LC-controlling technology so as to change position of a longwise axis of the corresponding LC molecule. While the ray passes through such a LC molecule, a different refraction change value can be therefore achieved. For example, when a conventional VA type LCD panel is in the on state, the electric field lines induces the longwise axis of the LC molecules to tilt in 90 degree from a perpendicular to a parallel with relation to the substrate, and thereby the ray could progress along the short axis of the LC molecules to minish the phase retardation resulted from both of the ordinary and extraordinary refractive indexes.

Based on different light sources and light-controlling processes, commonly-known liquid crystal display panel can be distinguished into a transmission type, a reflective type and a transflective type. Since the transmission type LCD panel has to use a backlight module for light source supply, this causes more power consumed. Besides the transmission type LCD panel possibly becomes dark under illumination of brightened light from the outdoor, and therefore can not provide bright and clear image display. Differently from use of backlight source, the reflective type LCD panel is additionally disposed a reflector thereon and therefore utilizes an external light from the environment to achieve the illumination for implementation of image display. Although the reflective type LCD panel has more power savings, its definition is easily affected by brightness of the external light. To eliminate the problem of either of the transmission type or reflective type, the transflective type LCD panel is proposed as shown in FIG. 1A, which includes a first substrate 10, a second substrate 12 with thin film transistors 121, and a LC layer 14 having a single cell gap (d) formed between both of the first and second substrates 10, 12. Each pixel constituted between both of the first and second substrates 10, 12 can be divided into a transmission region 100 and a reflective region 120 for concurrently obtaining the features of both the transmission type and reflective type LCD panels. The transmission region 100 employs a built-in backlight as a light source needed for image display, and therefore is suitable to use for the indoor environment. The reflective region 120 employs a reflector to reflect the ray from the outdoor environment as a light source, and therefore is suitable to use for the outdoor environment. Accordingly, the transflective type LCD panel can retain the same definition and brightness display, regardless of the indoor or outdoor, and provide a power-saving function.

However, when the conventional transflective type LCD panel is in a reflective mode such as the outdoor, an external ray (R) enters the LC layer 14 having a cell gap (d) in the reflective region 120, and then is reflected back by the reflector to the human eyes. Since the ray (R) passes through the cell gap (d) twice as approximate two-time cell gaps (2d), a refraction change value ($\Delta n_R$) of the reflective region 120 can be therefore achieved. Oppositely, when the conventional transflective type LCD panel is in a transmission mode such as the indoor, a ray (T) emitted from a backlight source located on the transmission region 100 passes through the same cell gap (d) once to enter the human eyes, a refraction change value ($\Delta n_T$) of the transmission region 100 can be therefore achieved. The refraction change value ($\Delta n_T$) of the transmission region 100 is approximately identical with refraction change value ($\Delta n_R$) of the reflective region 120 (i.e. $\Delta n_T \approx \Delta n_R$) because both of the regions 100, 120 use the same liquid crystal and LC tilt. However, this causes a difference between the phase retardation of the transmission region 100 and the phase retardation of the reflective region 120 (i.e. $\Delta n_T \times d \neq \Delta n_R \times 2d$). If the LC tilt of both the regions 100, 120 are different, it would cause the difference between the refraction change values of both the regions 100, 120 (i.e. $\Delta n_T \neq \Delta n_R$) and the difference between the phase retardations of both the regions 100, 120.

When the phase retardations of both the regions 100, 120 are different from each other, it is known from a transmittance-to-voltage coordinate diagram as depicted in FIG. 1B that a reflective-mode curve 20 and a transmission-mode curve 22 have different tracks and distributions from each other. It means that there are two different transmission ratios Tr, $T_{low}$ respectively appearing in both the regions 100, 120 of the panel under the same driving voltage. On the other respect, a driving voltage (Vt) used to generate a brightness (Tt) required for one of the modes is different from another driving voltage (Vr) used to generate a brightness (Tr) required for the other mode. Even any one of the modes obtains required brightness, yet the other mode has to sacrifice its optical display such that there might be problems of insufficient brightness or yellowing in gray display.

As shown in FIGS. 2A and 2B, conventional transflective type LCD panels 2A and 2B utilize controllable fabricating process to form dual cell gaps (d1, d2) on where is related to the transmission region and the reflective region on a substrate 26 having a driving transistors or a substrate having a color filter. For example, multi cell gaps are formed on thin film transistor array (MOA) or multi cell gaps are formed on the color filter (MOC), whereby the retardation change values of both of the transmission and reflective modes can be balanced to render gradual consistence between the ratios of the driving voltages to the transmittances in both of the transmission and reflective modes (i.e. $\Delta n_T \times d \approx \Delta n_R \times d/2$). However, to make different cell gaps from each other, the complexity of structural-fabricating process easily causes lower yield and higher expense, and also causes a light leakage on a bound between the transmission and reflective regions to get poor display definition. Besides other conventional transflective type LCD panel applies different driving voltages to render LC tilt difference between the transmission and reflective regions but is resulted in more complex design thereof.

SUMMARY OF INVENTION

To eliminate aforementioned problems, it is therefore a primary objective of the present invention to provide a transflective liquid crystal display panel which utilizes a first common electrode of a first substrate to correspond to a second common electrode and a pixel electrode of a second substrate in a reflective region, and thereby varies distribution of induced electric field lines to control tilt of the liquid crystals between the first and second substrates. Thus, the total retardation change value (i.e. phase retardation) of the reflective region can become consistent with the total retardation change value of the transmission region. It means that under the same driving voltage the transmittances of both the transmission and reflective regions can gradually reach consistence with each other.

It is a secondary objective of the present invention to provide a transflective liquid crystal display panel which has a single cell gap without implementation of fabricating process of multi cell gaps, and thereby can raise yield and reduce fabricating cost.

It is a secondary objective of the present invention to provide a transflective liquid crystal display panel which is capable of increasing reflective ratio to achieve a better readability, even under an environmental light.

To obtain aforementioned objective, the present invention discloses a transflective liquid crystal display panel which includes two opposite first and second substrates and a liquid crystal layer formed with a single cell gap between the first and second substrates, wherein the first substrate has a color filter layer and a first common electrode layer facing to the liquid crystal layer, and the second substrate serves as a thin film transistor array substrate and provides a plurality of thin film transistors, a pixel electrode layer, a second common electrode layer, a plurality of scan lines and a plurality of data lines to construct a plurality of pixels. Each of the pixels is divided into a transmission region and a reflective region depending on the requirements for different light sources (e.g. an indoor or outdoor light). The pixel electrode layer further includes a transparent electrode layer allocated on the transmission region and a reflective electrode layer allocated on the reflective region. The second common electrode layer overlaps over the pixel electrode layer and faces the liquid crystal layer than the pixel electrode layer.

The second common electrode layer allocated on the reflective region is formed with a plurality of apertures each which has a specific width (W1) so as to expose the pixel electrode layer (i.e. the reflective electrode layer) to the liquid crystal layer. An aperture interval (W2) made of the second common electrode layer is formed between each two of the apertures. Based on structural allocation in a specific ratio (W1/W2) of the aperture width (W1) to the aperture interval (W2), the second common electrode layer and pixel electrode layer in the second substrate are exposed to the liquid crystal layer. By the first common electrode layer of the reflective region of the first substrate corresponding to the second common electrode layer and pixel electrode layer exposed by the specific ratio (W1/W2) of the aperture width (W1) to the aperture interval (W2) in the second substrate, different electric field directions under the same driving voltage can be respectively achieved for the liquid crystals controlled by the transmission and reflective regions, and thereby render different tilts of the liquid crystals controlled by the transmission and reflective regions. Thus, the total retardation change value (i.e. phase retardation) of the reflective region can become consistent with the total retardation change value of the transmission region. It means that the transmittances of both the transmission and reflective regions gradually reach consistence with each other.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
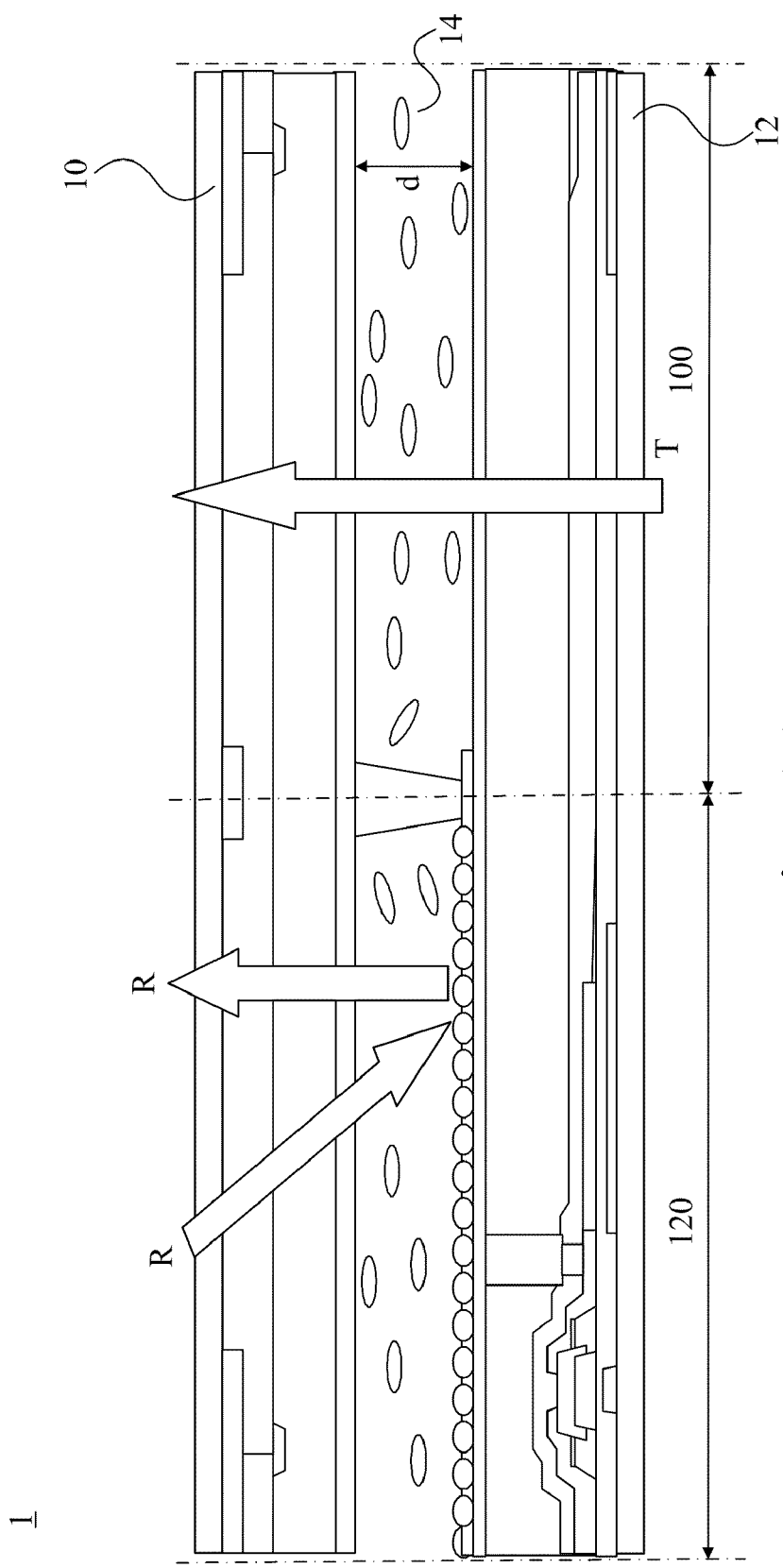
FIG. 1A illustrates a cross-sectional view of a conventional transflective liquid crystal display panel.
Figure 1B:
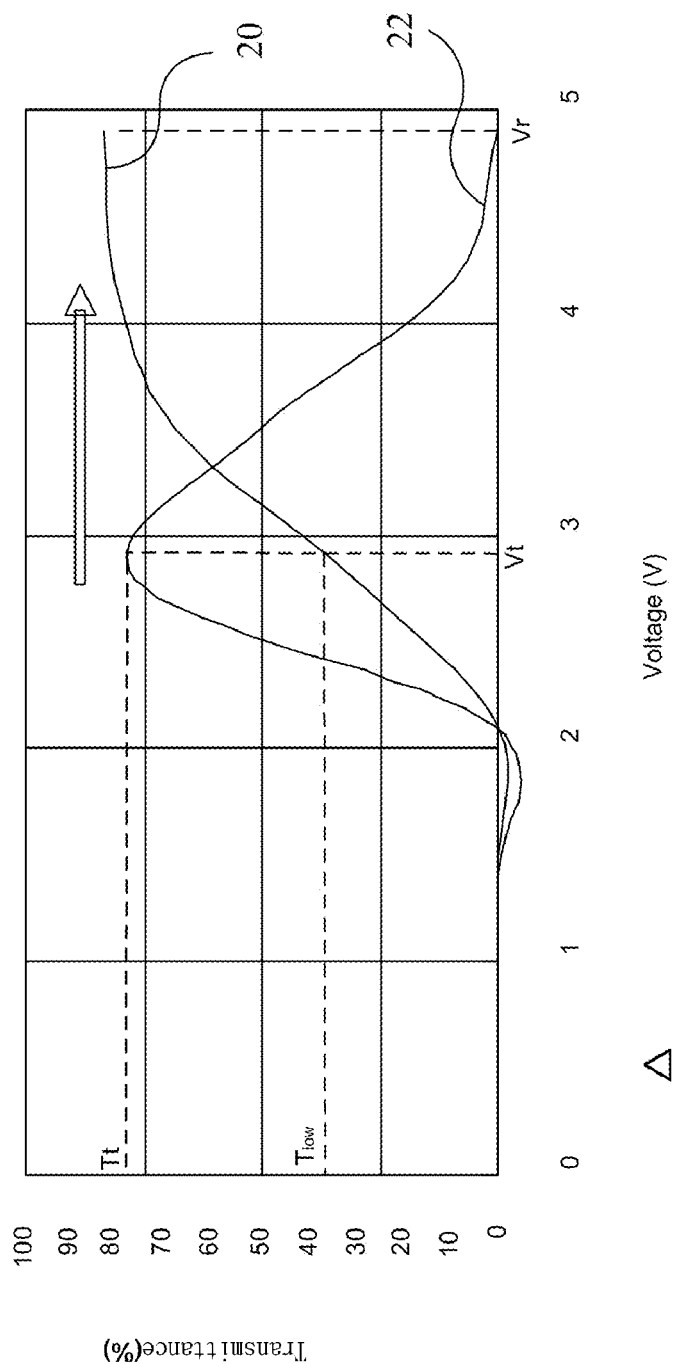
FIG. 1B illustrates a transmittance-to-voltage curve coordinate diagram according to the conventional transflective liquid crystal display panel shown in FIG. 1A.
Figure 2A:
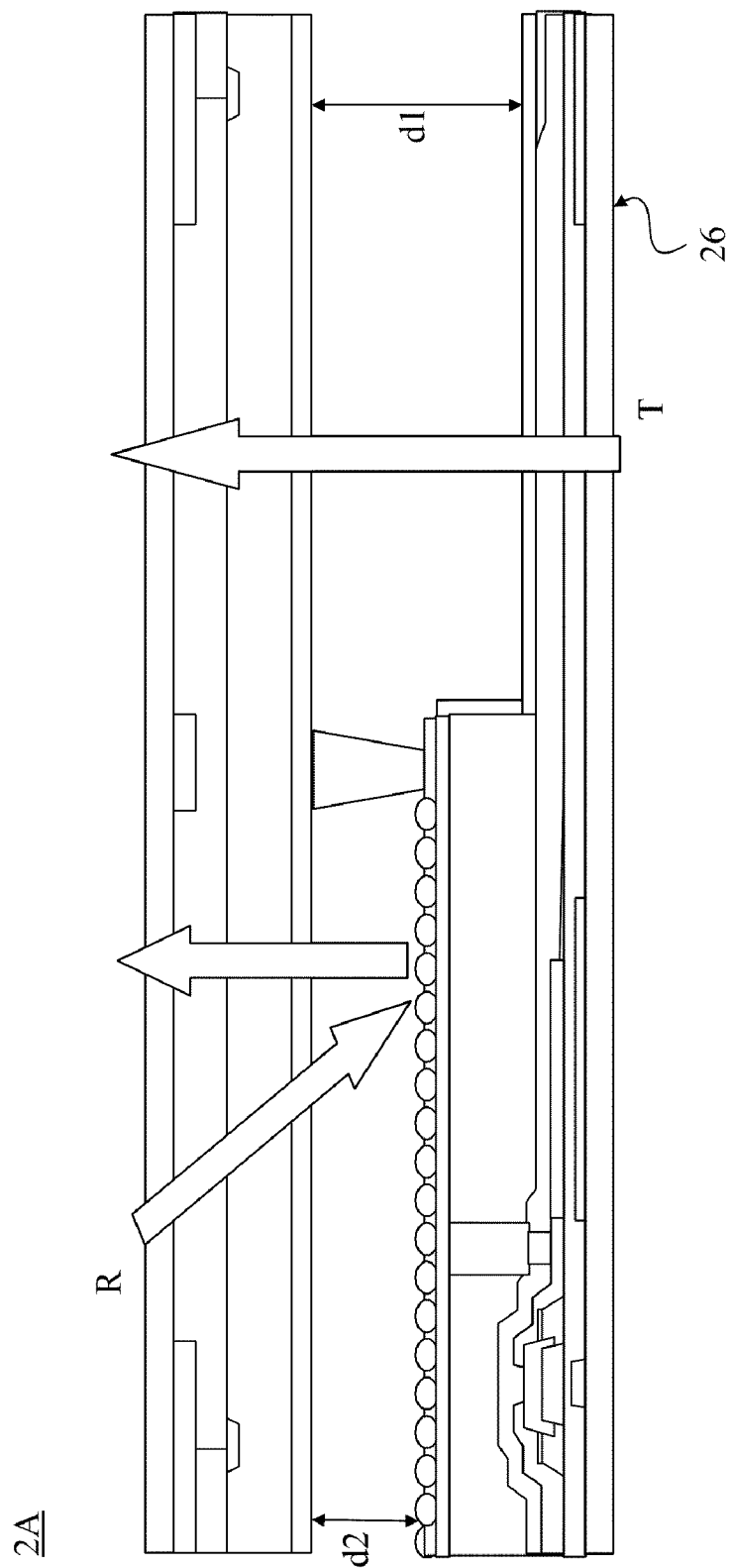
FIG. 2A illustrates a cross-sectional view of a conventional transflective liquid crystal display panel having multi cell gaps.
Figure 2B:
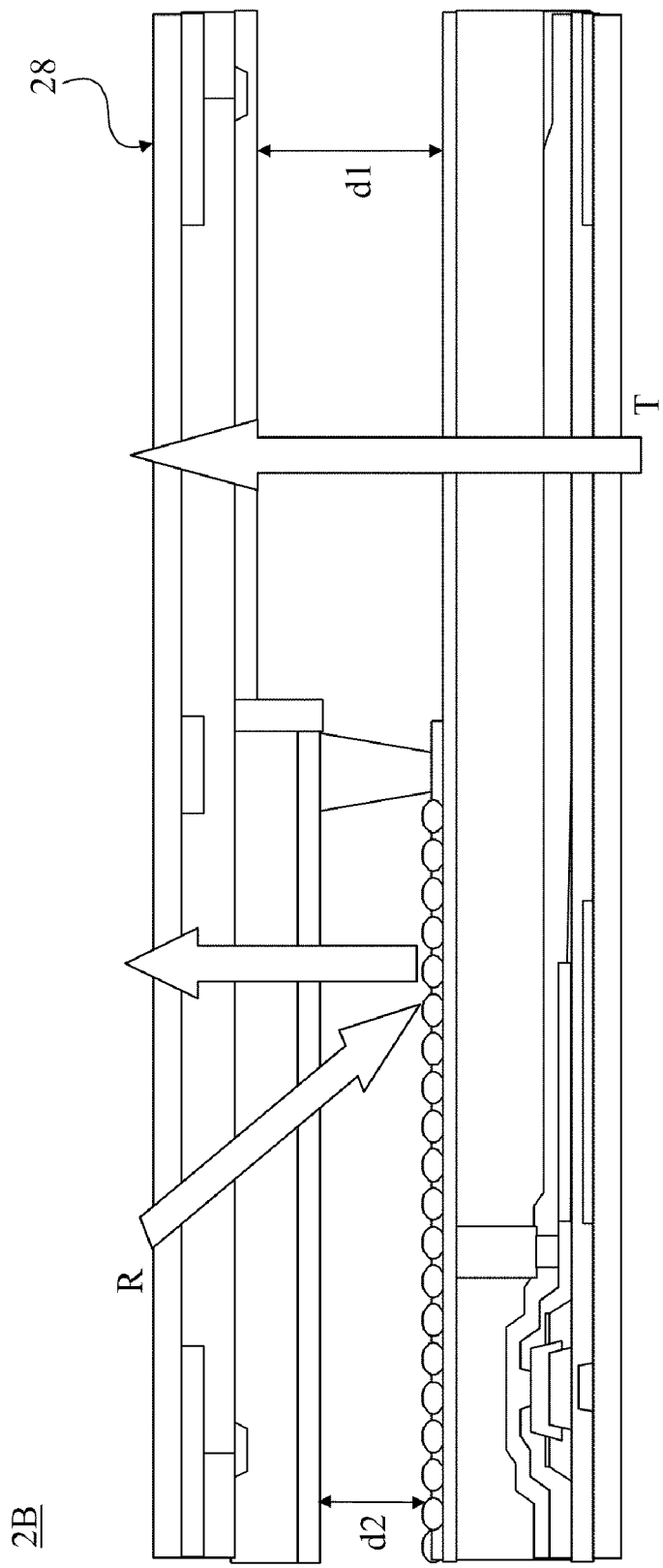
FIG. 2B illustrates a cross-sectional view of another conventional transflective liquid crystal display panel having multi cell gaps.
Figure 3A:
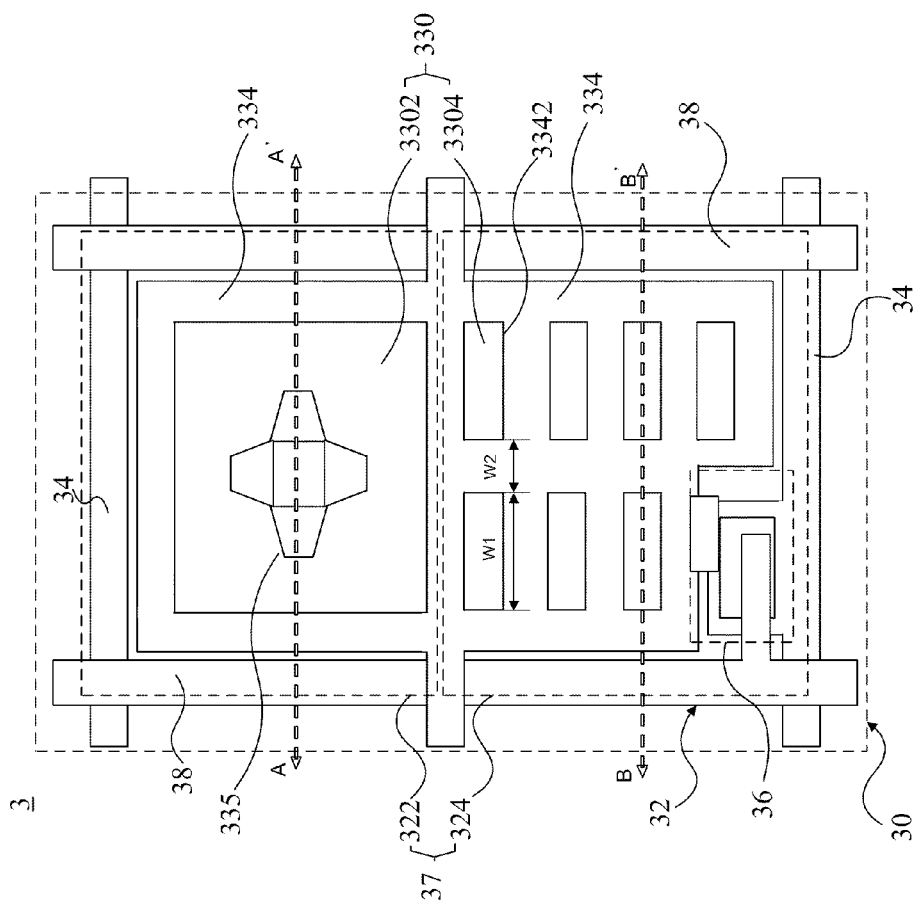
FIG. 3A illustrates a schematic diagram of a transflective liquid crystal display panel according to a first preferred embodiment of the present invention.
Figure 3B:
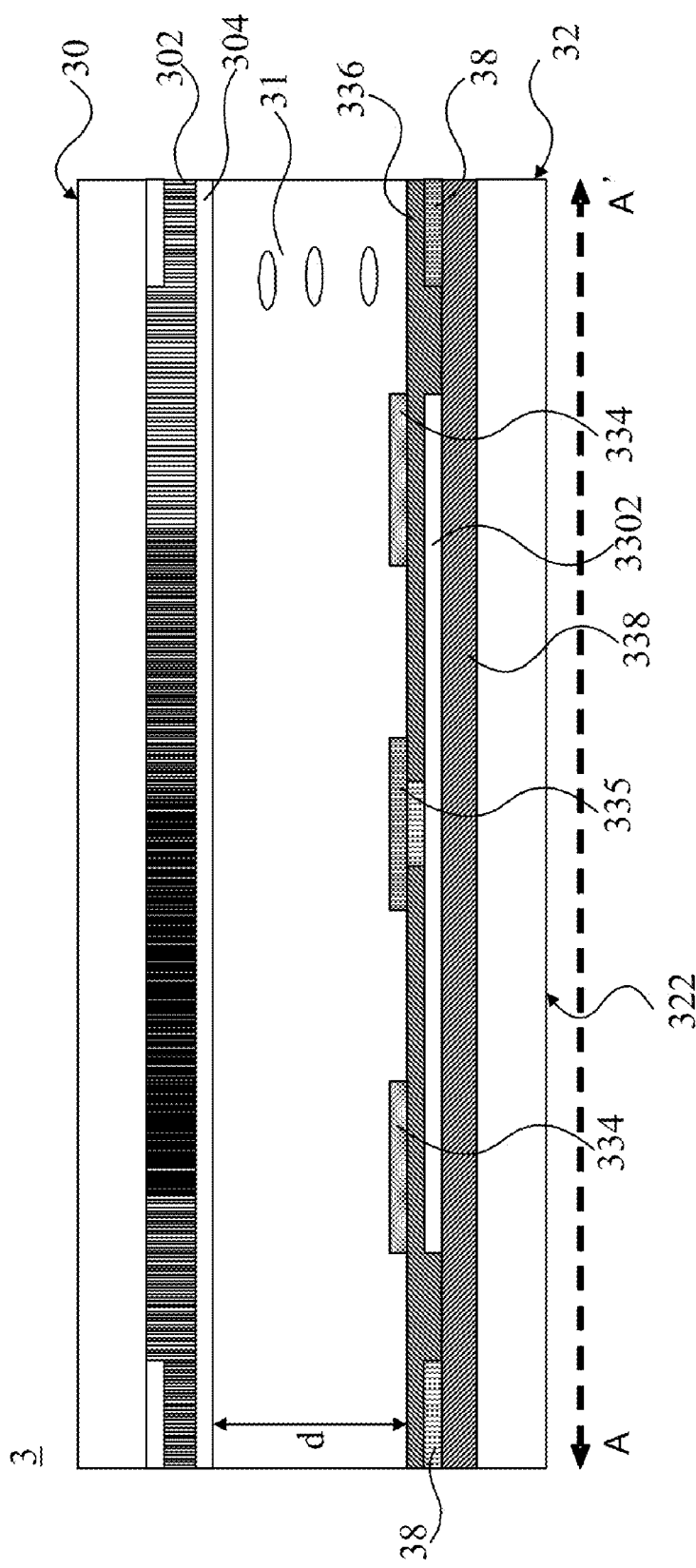
FIG. 3B illustrates a cross-sectional view along a dividing line A-A' of a transmission region of the transflective liquid crystal display panel shown in FIG. 3A.
Figure 3C:
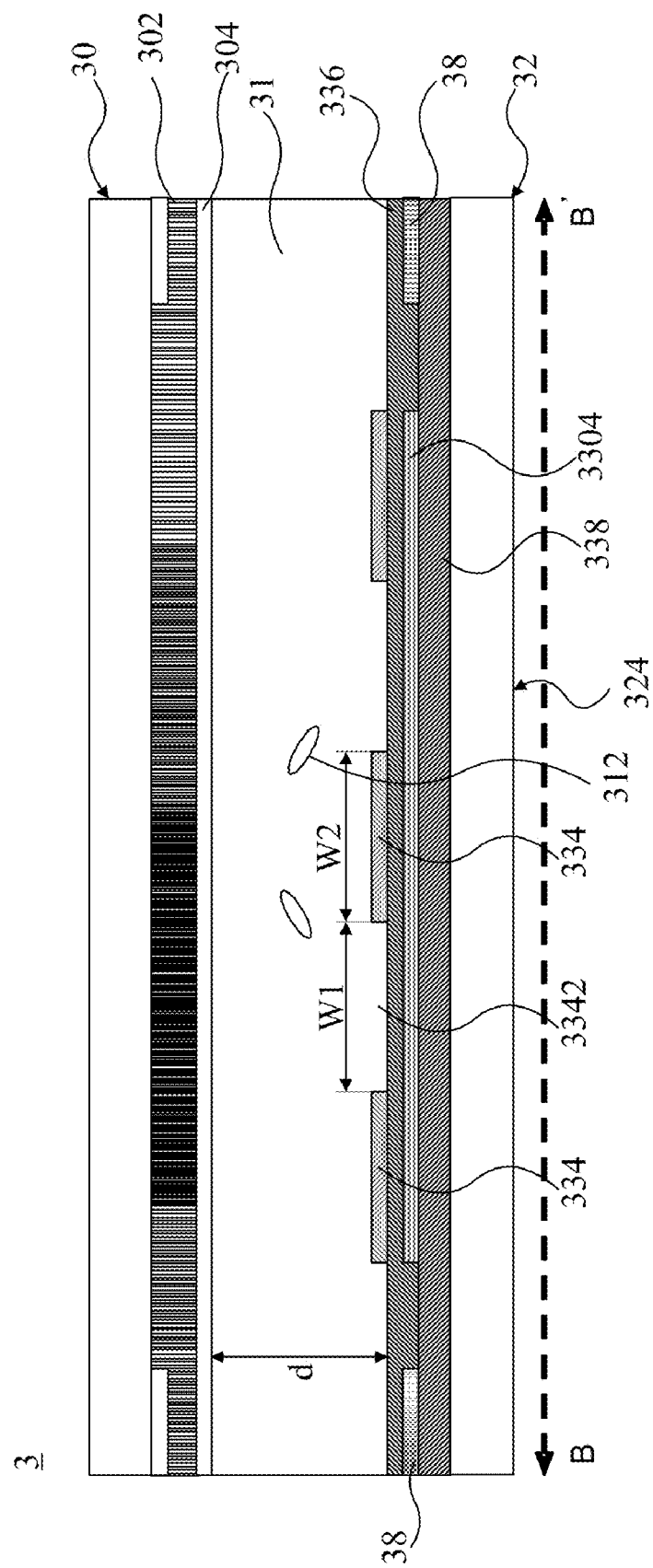
FIG. 3C illustrates a cross-sectional view along a dividing line B-B' of a reflective region of the transflective liquid crystal display panel shown in FIG. 3A.

Firstly referring to FIGS. 3A, 3B & 3C, a transflective liquid crystal display panel 3 according to a first preferred embodiment of the present invention is introduced hereafter. FIG. 3B shows a cross-sectional view along a dividing line A-A' of a transmission region of the transflective liquid crystal display panel 3 shown in FIG. 3A. FIG. 3C shows a cross-sectional view along a dividing line B-B' of a reflective region of the transflective liquid crystal display panel 3 shown in FIG. 3A. The transflective liquid crystal display panel 3 includes two opposite substrates, first substrate 30 and second substrate 32, and a liquid crystal (LC) layer 31 therebetween. In this embodiment, the LC layer 31 can be constructed with a single cell gap (d) by sealing some negative LC molecules (i.e. an anisotropic dielectric constant ($\Delta\varepsilon$)<0) between the first and second substrates 30, 32. The first substrate 30 may have a color filter layer 302 and a first common electrode layer 304 formed over the surface of the color filter layer 302 and facing to the LC layer 31.

As shown in FIG. 3A, the second substrate 32 may serve as a thin film transistor (TFT) array substrate and provides a plurality of TFTs 36, a pixel electrode layer 330, a second electrode layer 334, a plurality of scan lines (or gate lines) 34, and a plurality of data lines (or source lines) 38. An intersection of each of the scan lines 34 and each of the data lines 38 is disposed with an associated TFT 36 which has a gate for electrically connecting to the corresponding scan line 34, a source for electrically connecting to the corresponding data line 38, and a drain for electrically connecting to the pixel electrode layer 330. Thus, the TFTs 36, the pixel electrode layer 330, the scan lines 34, the data lines 38, storage capacitors ($C_s$) and LC capacitors ($C_{LC}$) are utilized to construct a plurality of pixels 37. Depending on the requirements for different light sources (e.g. an indoor or outdoor light), each of the pixels 37 is divided into a transmission region 322 for processing a transmission mode with such as a backlight source, and a reflective region 324 for processing a reflective mode with such as an outdoor light.

Further referring to FIGS. 3A, 3B and 3C, the pixel electrode layer 330 of each of the pixels 37 is surrounded by the scan lines 34 and the data lines 38 and extended to the transmission region 322 and the reflective region 324, wherein the pixel electrode layer 330 includes a transparent electrode layer 3302 made of such as an Indium Tin Oxide (ITO) allocated on the transmission region 322 for light transmission, and a metallic reflective electrode layer 3304 allocated on the reflective region 324.

Besides, in the transmission region 322 and the reflective region 324 of the second substrate 32 as shown in FIGS. 3B and 3C, a first dielectric layer 336 and the second common electrode layer 334 are formed to sequentially overlap over the pixel electrode layer 330 and be closer to face the LC layer 31 than the pixel electrode layer. A second dielectric layer 338 is formed below the pixel electrode layer 330. It notes that the first dielectric layer 336 can be constructed by an inorganic layer made of some materials including, for example, silicon nitride (SiNx), silicon oxide (SiOx) or silicon oxynitride (SiON), so as to serve as an insulator layer for insulating the pixel electrode layer 330 from electrical connection of the second common electrode layer 334. The second dielectric layer 338 adopts the same material as the first dielectric layer 336 or the like, and may serve as a gate insulator layer sandwiched between the gate and the source or the drain in the TFT 36 for insulating the gate of the TFT 36 from electrical connection of the pixel electrode layer 330 so as to protect the TFT 36.

However, the structure of the second common electrode layer 334 formed on the transmission region 322 differs from the structure of the second common electrode layer 334 formed on the reflective region 324. As shown in FIGS. 3A and 3B, the second common electrode layer 334 of the transmission region 322 is extended to merely surround the inside of the transmission region 322 to expose the transparent electrode layer 3302 and some patterned structures 335 on the center of the transmission region 322 to the LC layer 31, wherein the patterned structures 335 generally have the same potential as the pixel electrode 330.

Differently, as shown in FIGS. 3A and 3C, the second common electrode layer 334 of the reflective region 324 is formed with a plurality of apertures 3342. Each of the apertures 3342 has a specific width (W1) to expose the pixel electrode layer 330 (i.e. the reflective electrode layer 3304) to the LC layer 31, as forming a reflective electrode layer 3304 on the second common electrode layer 334. An aperture interval (W2) made of the second common electrode layer 334 is formed between each two of the apertures 3342. Based on structural allocation in a specific ratio (W1/W2) of the aperture width (W1) to the aperture interval (W2), the second common electrode layer 334 and pixel electrode layer 330 on the second substrate 32 are exposed to the LC layer 31. In this embodiment, the specific ratio (W1/W2) can be determined from 0.1 to 10 as shown in FIG. 3B but does not therefore limit the claimed scope of the present invention.

Figure 4:
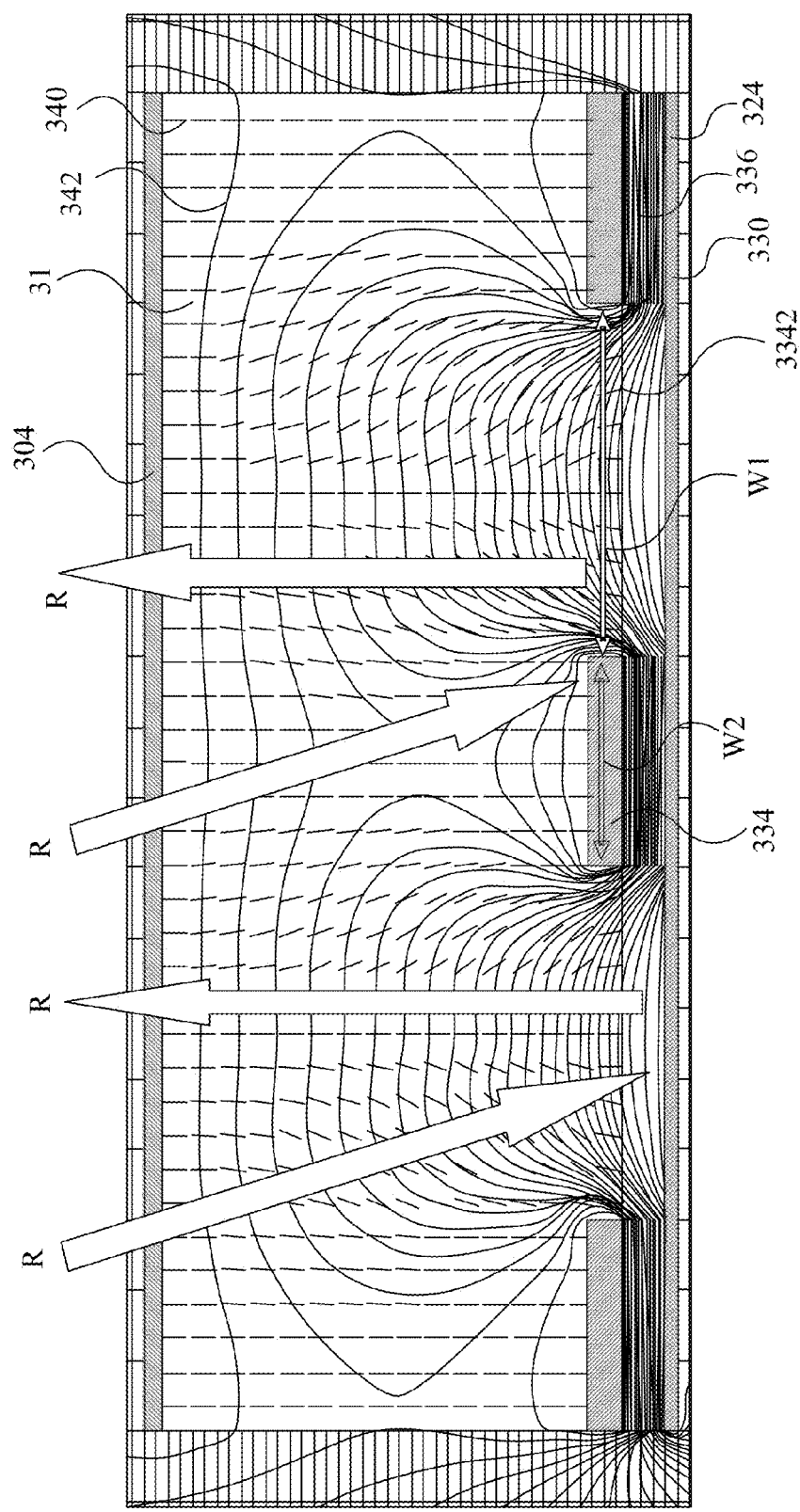
FIG. 4 illustrates a schematic electric field distributing diagram of the transflective liquid crystal display panel shown in FIG. 3C.
Figures 5A, 5B:
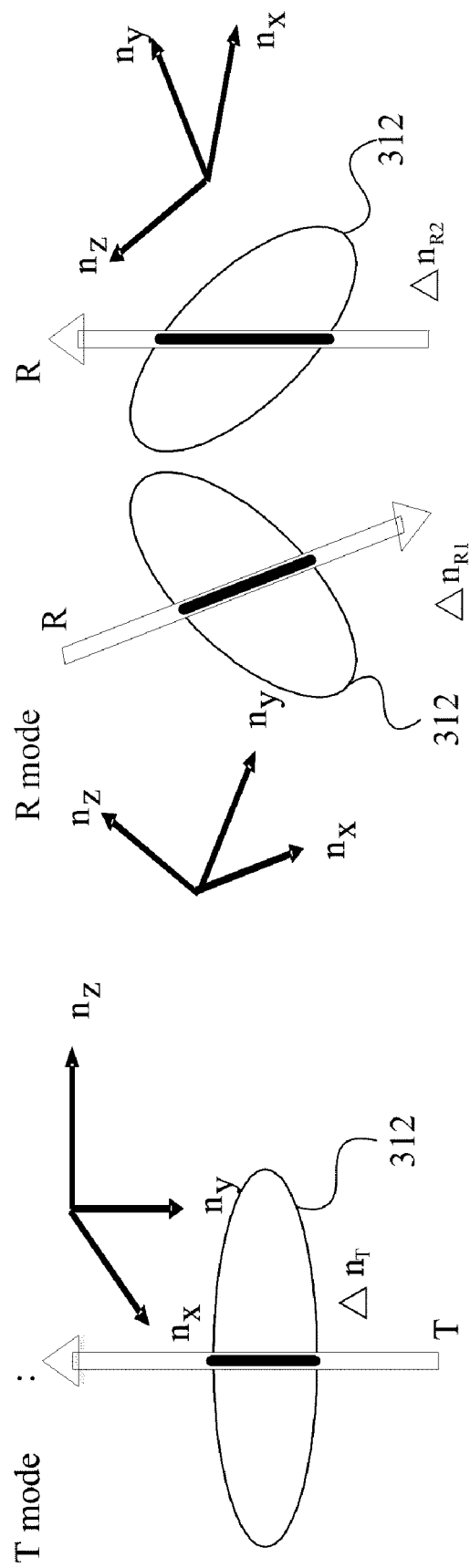
FIG. 5A illustrates a schematic liquid crystal response diagram of the transmission region of the transflective liquid crystal display panel shown in FIG. 3A.
FIG. 5B illustrates a schematic liquid crystal response diagram of the reflective region of the transflective liquid crystal display panel shown in FIG. 3A.

Since structures of the second common electrode layer 334 and pixel electrode layer 330 respectively formed on both of the transmission and reflective regions 322, 324 on the second substrate 32 are different from each other, different electric field directions under the same driving voltage can be respectively induced for the LC controlled by the transmission and reflective regions 322, 324. From an electric field line distributing diagram shown in FIG. 4, it is found that the first common electrode layer 304 of the reflective region 324 of the first substrate 30 corresponds to the second common electrode layer 334 and pixel electrode layer 330 arranged in the specific ratio (W1/W2) of the aperture width (W1) to the aperture interval (W2) on the second substrate 32. Because the first common electrode layer 304 and the second common electrode layer 334 has the same potential, a confronting area between the first and second common electrode layers 304, 334 on the reflective region 324 can induce a plurality of equipotential lines 342. By the apertures 3342 and the second common electrode layer 334 arranged in the specific ratio (W1/W2) of the aperture width (W1) to the aperture interval (W2) on the reflective region 324, a part of the equipotential lines 342 neighboring on the center of each of the aperture 3342 are influenced by both of the first common electrode layer 304 and the pixel electrode layer 330 to distributely curve toward a near-to-horizontal direction, except that some of the equipotential lines 342 adjacent to both sides of the aperture 3342 are distributed toward two symmetric and incline directions. Actually, the whole equipotential lines 342 are distributed along a rippling direction, whereby some LC on the reflective region 324 can be controlled to tilt toward different direction. For example, two LC 312 as shown in FIGS. 3C and 5A tilt at different angles. That is because an arranging direction 340 of the short axis of each distributed LC 312 has to be perpendicular to the equipotential line 342, and the pixel electrode layer 330 exposed by the aperture 3342 has different potential from the first common electrode layer 304 to gradually tilt the arranging direction 340 of the short axis of each distributed LC 312 adjacent to both sides of the aperture 3342 of the second common electrode layer 334, toward the center of the corresponding aperture 3342. Differently, as shown in FIGS. 3A an 3B, the transmission regions 322 expose the pixel electrode layer 330 (i.e. a transparent electrode layer) to the first common electrode layer 304 to distribute the equipotential lines 342 of the transmission regions 322 along a horizontal direction with relation to the first and second substrates 30, 32, and thereby tilt the LC 312 of the transmission regions 322 as shown in FIG. 5B. The short axis of the tilted LC 312 controlled by the transmission regions 322 is near-to-perpendicular to the first and second substrates 30, 32 and differs from the tilt angle of the LC 312 (as shown in FIG. 5A) controlled by the reflective region 324.

As shown in FIGS. 3B and 5B, while a ray (T) passes through the transmission region 322 to enter the LC layer 31 during a transmission mode (as T mode), by the tilts of LC 312 of the transmission region 322 achieved under the same driving voltage (e.g. the longwise axis of the LC 312 is near-to-parallel to the substrates 30, 32 but the short axis of the LC 312 is near-to-perpendicular to the substrates 30, 32), the ray (T) can be incident into the LC 312 along a direction perpendicular to the longwise axis of the LC 312 to achieve a first refraction change value ($\Delta n_T$) and a first cell gap value ($d_T$) with relation to the transmission region 322. Thus, a first total retardation change value ($\Delta n_T \times d_T$) of the LC 312 controlled by the transmission region 322 can be achieved by a product of the first refraction change value ($\Delta n_T$) multiplying the first cell gap value ($d_T$).

Figure 6:
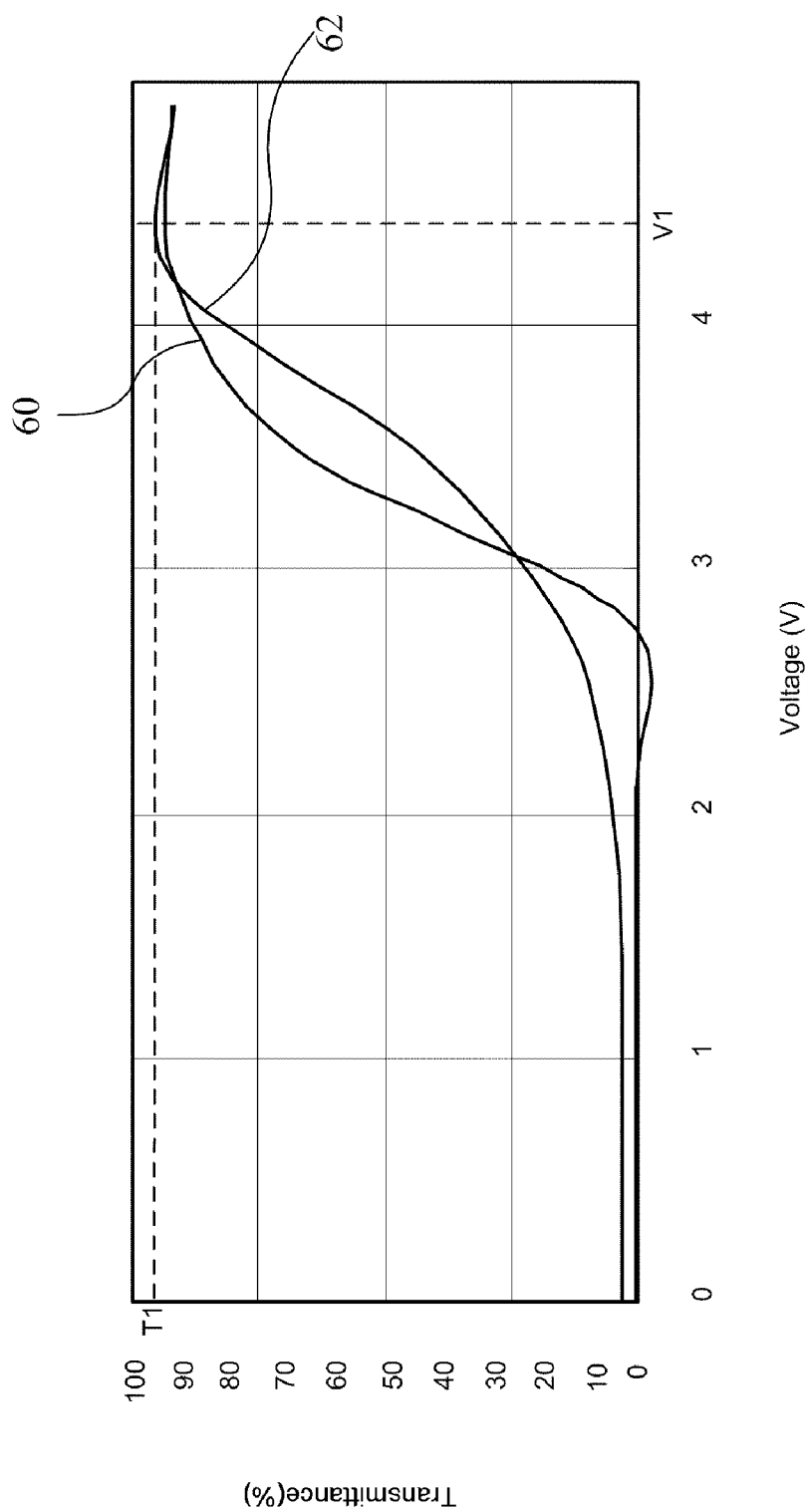
FIG. 6 illustrates a transmittance-to-voltage curve coordinate diagram of the transflective liquid crystal display panel shown in FIG. 3A.

Besides, as shown in FIGS. 3C and 5A, while a ray (R) passes through the reflective region 324 to enter the LC layer 31 and a reflective ray is generated during a reflective mode (as R mode), by different tilts of two LC 312 of the reflective region 324 achieved under the same driving voltage, a second refraction change value ($\Delta n_{R1}$), a second cell gap value ($d_{R1}$), a third refraction change value ($\Delta n_{R2}$) and a third cell gap value ($d_{R2}$) with relation to the reflective region 324 can be respectively achieved therefore. Thus, a second total retardation change value ($\Delta n_{R1} \times d_{R1}$) during the incidence of the ray R to the LC 312 of the reflective region 324 can be achieved by a product of the second refraction change value ($\Delta n_{R1}$) multiplying the second cell gap value ($d_{R1}$), and a third total retardation change value ($\Delta n_{R2} \times d_{R2}$) during the reflection of the ray R to the LC 312 of the reflective region 324 can be achieved by a product of the third refraction change value ($\Delta n_{R2}$) multiplying the third cell gap value ($d_{R2}$). The first cell gap value ($d_T$), second cell gap value ($d_{R1}$) and third cell gap value ($d_{R2}$) are almost the same. But the ray (T) of the transmission region 322 is incident into the LC 312 along the direction perpendicular to the longwise axis of the LC 312, it causes that the first refraction change value ($\Delta n_T$) is larger than either the second refraction change value ($\Delta n_{R1}$) or the third refraction change value ($\Delta n_{R2}$). By properly arrangement, the second total retardation change value ($\Delta n_{R1} \times d_{R1}$) and the third total retardation change value ($\Delta n_{R2} \times d_{R2}$) of the reflective region 324 is approximately equal to the first total retardation change value ($\Delta n_T \times d_T$) of the transmission region 322 (i.e. $\Delta n_T \times d_T = (\Delta n_{R1} \times d_{R1}) + (\Delta n_{R2} \times d_{R2})$). It means that the phase retardations of both the transmission region 322 and the reflective region 324 gradually reach consistent with each other. Thus, in a transmittance-to-voltage coordinate shown in FIG. 6, it is found that the transmittances gradually reaches consistence with T1 under the same driving voltage V1 according to a curve 60 for the transmission region 322 and a curve 62 for the reflective region 324

Figure 7A:
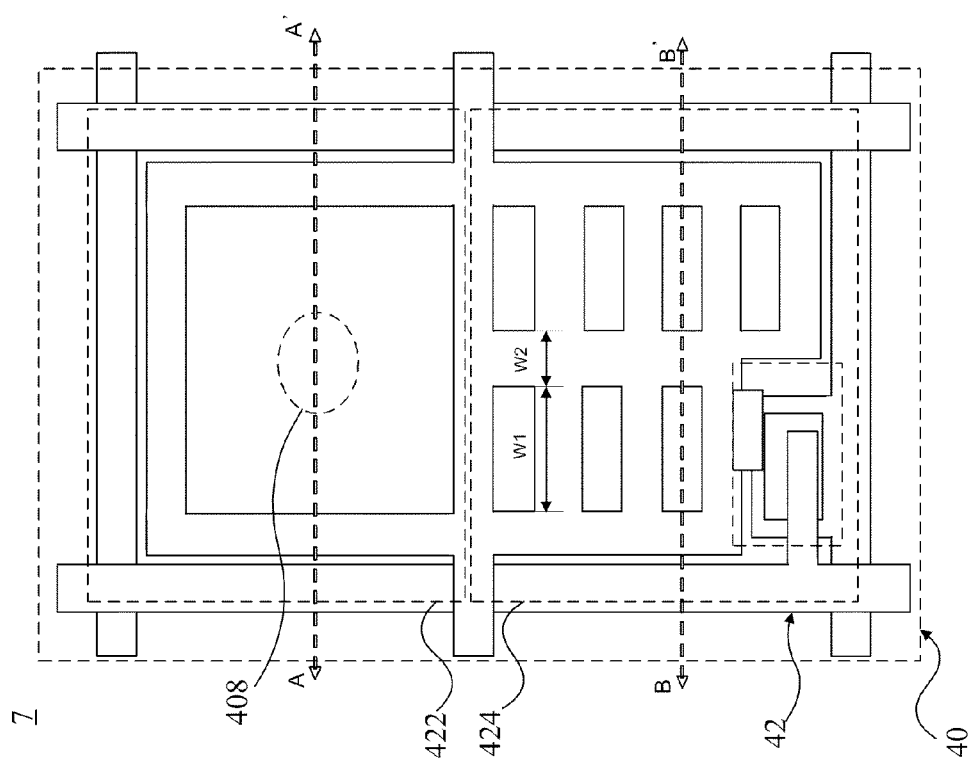
FIG. 7A illustrates a schematic diagram of a transflective liquid crystal display panel according to a second preferred embodiment of the present invention.
Figure 7B:
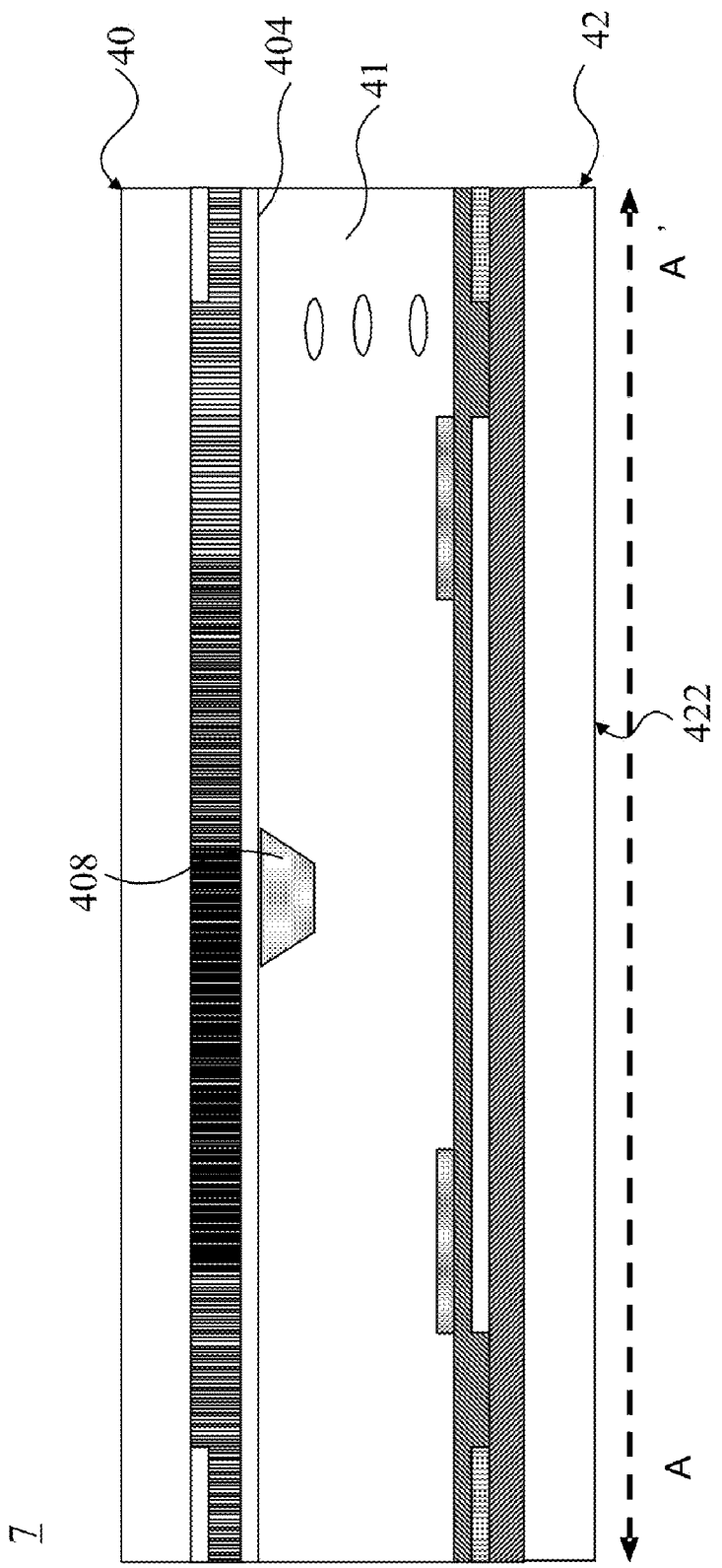
FIG. 7B illustrates a cross-sectional view along a dividing line A-A' of a transmission region of the transflective liquid crystal display panel shown in FIG. 7A.
Figure 7C:
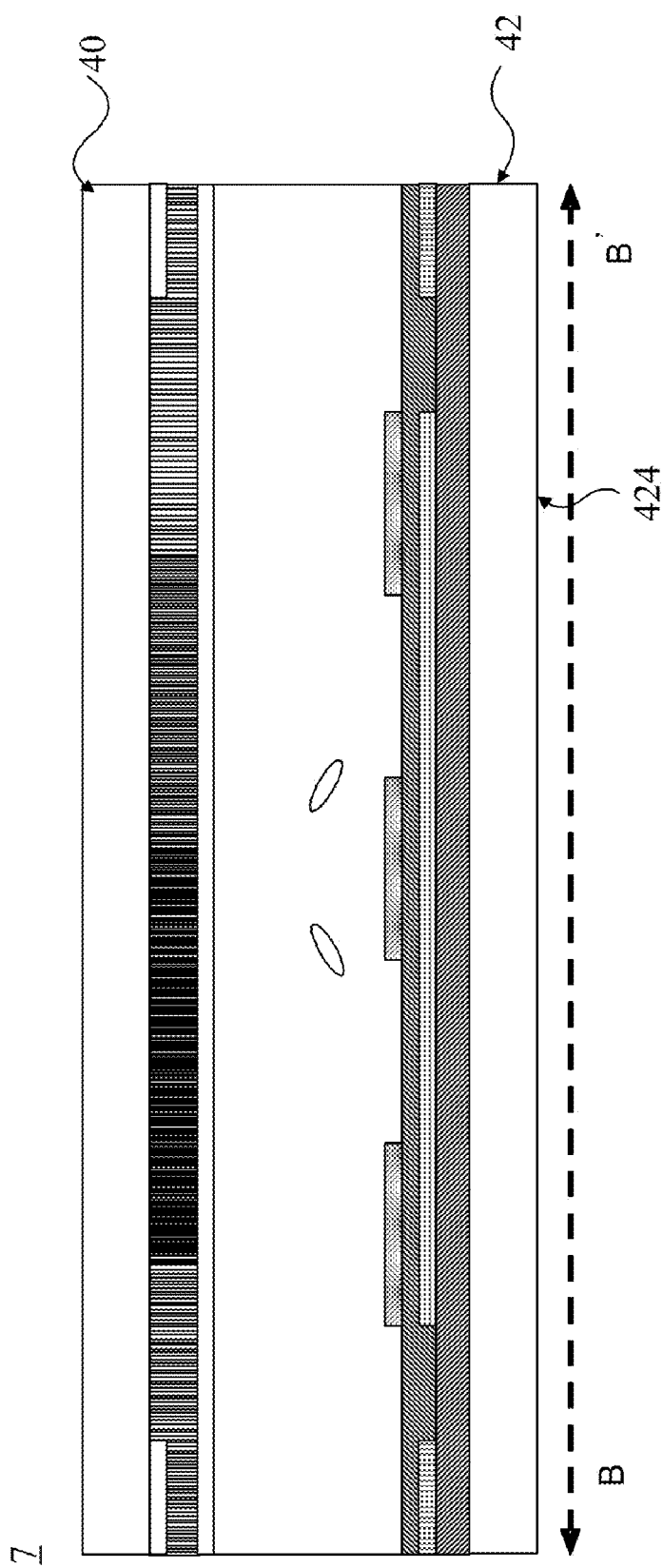
FIG. 7C illustrates a cross-sectional view along a dividing line B-B' of a reflective region of the transflective liquid crystal display panel shown in FIG. 7A.

Further referring to FIGS. 7A, 7B and 7C, a transflective liquid crystal display panel 7 according to a second preferred embodiment of the present invention is introduced hereafter. FIG. 7B shows a cross-sectional view along a dividing line A-A' of a transmission region of the transflective liquid crystal display panel 7 shown in FIG. 7A. FIG. 7C shows a cross-sectional view along a dividing line B-B' of a reflective region of the transflective liquid crystal display panel 7 shown in FIG. 7A. In this embodiment, the transflective liquid crystal display panel 7 serves a Multi-Domain Vertical Alignment (MVA-b) type, and has the same reflective region structure 424 as described in the first embodiment and therefore is omitted hereafter.

There are some differences of the second embodiment from the first embodiment. In the second embodiment, the first common electrode layer 404 on the first substrate 40 of the transflective liquid crystal display panel 7 is formed with a protrusion (or called 'bump') 408 corresponding to the transmission region 422 of the second substrate 42. And, the center of the transmission region 422 of the second substrate 42 is not formed with a patterned structure as described in the first embodiment, which has the same potential as the data lines 38. Thus, when none of the driving voltage is applied, the longwise axis of the LCs in the LC layer 41 are near-to-perpendicular to both substrates 40, 42, except that a part of the adjacent LC surrounding to the protrusion 408 are influenced by the local effect to pre-tilt toward a specific angle or direction. As long as the driving voltage is applied, different inclines formed on the protrusion 408 can respectively tilt the adjacent LCs toward different directions (e.g. symmetric or opposite directions), as dividing each pixel into different domains for broadening the visual-angle boundary.

Figure 8A:
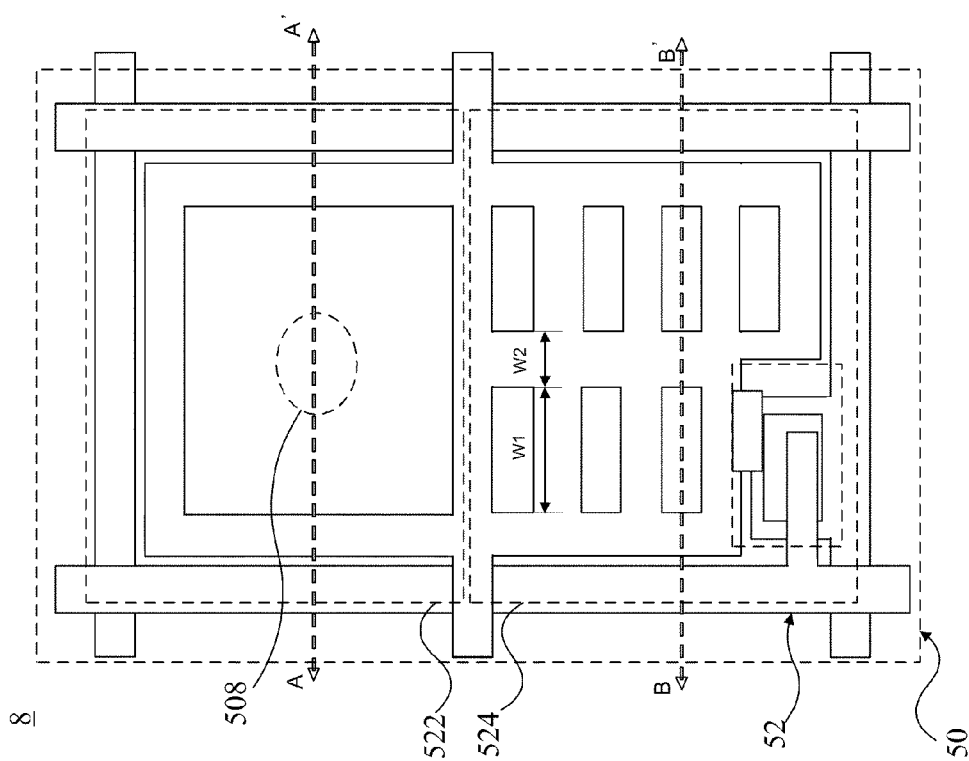
FIG. 8A illustrates a schematic diagram of a transflective liquid crystal display panel according to a third preferred embodiment of the present invention.
Figure 8B:
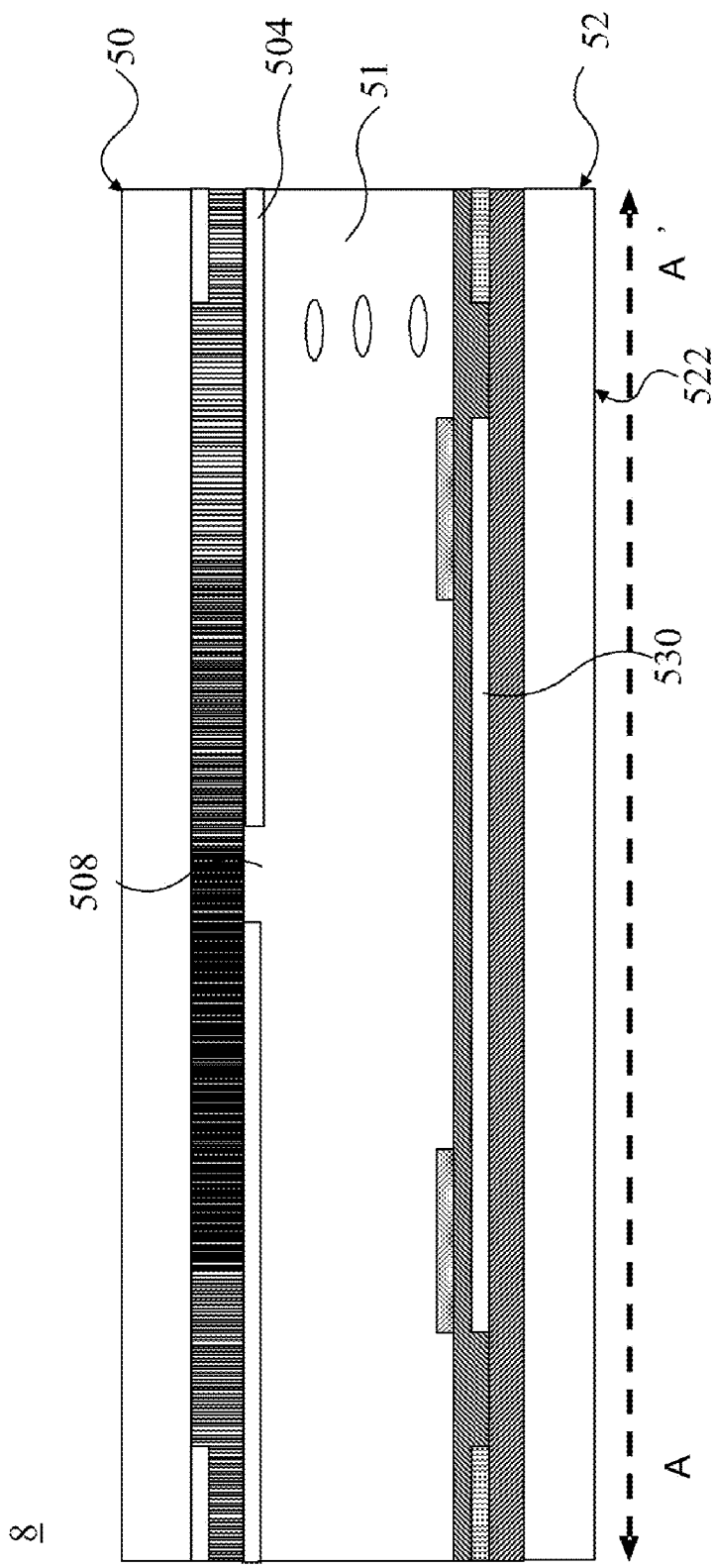
FIG. 8B illustrates a cross-sectional view along a dividing line A-A' of a transmission region of the transflective liquid crystal display panel shown in FIG. 8A.
Figure 8C:
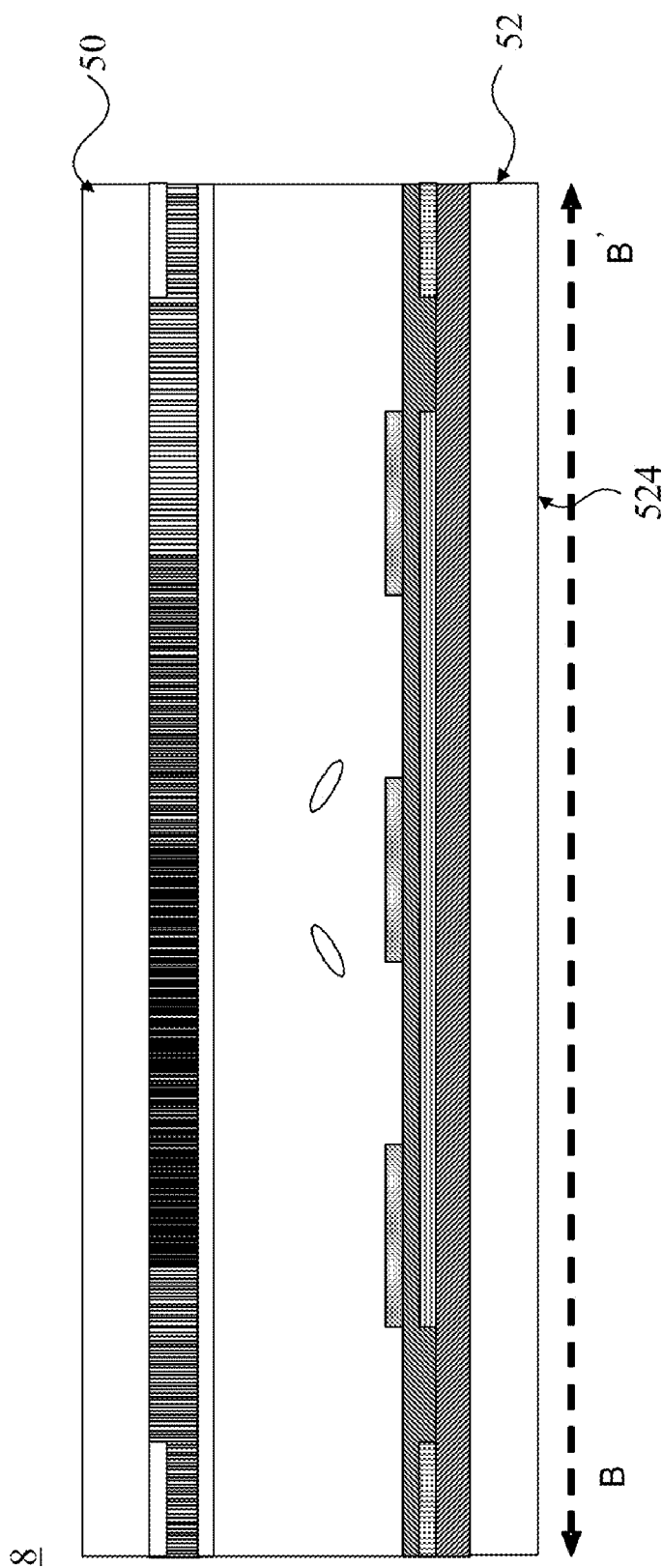
FIG. 8C illustrates a cross-sectional view along a dividing line B-B' of a reflective region of the transflective liquid crystal display panel shown in FIG. 8A.

Further referring to FIGS. 8A, 8B and 8C, a transflective liquid crystal display panel 8 according to a third preferred embodiment of the present invention is introduced hereafter. FIG. 8B shows a cross-sectional view along a dividing line A-A' of a transmission region of the transflective liquid crystal display panel 8 shown in FIG. 8A. FIG. 8C shows a cross-sectional view along a dividing line B-B' of a reflective region of the transflective liquid crystal display panel 8 shown in FIG. 8A. Since the transflective liquid crystal display panel 8 of the third embodiment has the same reflective region structure 524 as described in the first and second embodiments and therefore is omitted hereafter. Some differences of the third embodiment from the second embodiment are that in the third embodiment the first common electrode layer 504 on the first substrate 50 of the transflective liquid crystal display panel 8 is formed with an opening 508, instead of the protrusion 408 described in the second embodiment, with correspond to the transmission region 522 of the second substrate 52. The inside of the opening 508 can not provide the first common electrode layer 504 to correspond to the pixel electrode layer 530 of the second substrate 52. Thus, as long as the driving voltage is applied, a confronting area between the pixel electrode layer 530 and the first common electrode layer 504 on both sides of the opening 508 can induce distributions of the arc-shaped equipotential lines to respectively tilt the LCs adjacent to both sides of the opening 508 toward different directions.

According to other preferred embodiment of the present invention, a second substrate (i.e. a TFT array substrate) of a transflective liquid crystal display panel can be formed with a plurality of roughs and uneven structures (e.g. bump) or evened structures, the second common electrode layer and a plurality of apertures having specific width and interval. Nevertheless, the transmission region structures on both the first and second substrates of the transflective liquid crystal display panel described in said embodiments can not limit the claimed scope of the present invention and can be any shape which does not affect function of the reflective region claimed.

In conclusion, the transflective liquid crystal display panel according to the present invention utilizes the first common electrode of the first substrate to correspond to the second common electrode and the pixel electrode arranged in the arranged in the specific ratio (W1/W2) of the aperture width (W1) to the aperture interval (W2) on the second substrate (i.e. a TFT array substrate) in the reflective region, and thereby varies distribution of induced electric field lines for controlling tilt of the liquid crystals between the first and second substrates. Thus, the total retardation change value (i.e. a phase retardation) of the reflective region can become consistent with the total retardation change value of the transmission region. It means that under the same driving voltage the transmittances of both the transmission and reflective regions can gradually reach consistence with each other. By the transflective liquid crystal display panel having a single cell gap, fabricating process of multi cell gaps are needless. Therefore, the present invention can not only raise yield and reduce fabricating cost but also increase reflective ratio of the panel to achieve a better readability, even under an environmental light.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A transflective liquid crystal display panel comprising:
   a first substrate having a first common electrode layer;
   a second substrate divided into a transmission region and a reflective region, having at least one second common electrode layer and pixel electrode layer; and
   a liquid crystal layer having liquid crystals, located within a cell gap between the first and second substrates, the pixel electrode layer including a transparent electrode layer allocated on the transmission region and a reflective electrode layer allocated on the reflective region, the second common electrode layer facing to the liquid crystal layer and overlapping with the pixel electrode layer in the reflective region, the second common electrode layer having a plurality of apertures to expose the pixel electrode layer, wherein each of the apertures has a specific width and an aperture interval is formed between each two of the apertures whereby a specific ratio of the aperture width to the aperture interval in structural allocation can be determined from 0.1 to 10.

2. The transflective liquid crystal display panel as described in claim 1, further comprises a color filter layer formed between the first common electrode layer and the first substrate.

3. The transflective liquid crystal display panel as described in claim 1, wherein the second substrate includes a thin film transistor array substrate having at least one thin film transistor.

4. The transflective liquid crystal display panel as described in claim 3, further comprises a first insulator layer formed between the second common electrode layer and the pixel electrode layer.

5. The transflective liquid crystal display panel as described in claim 1, wherein the specific ratio of the aperture width to the aperture interval respectively induces different electric field directions for the liquid crystals controlled by the transmission region and a reflective region under the same driving voltage to render different tilt angle of the liquid crystals controlled by the reflective region from tilt angle of the liquid crystals controlled by the transmission region but consistence of the transmittances on both of the transmission region and a reflective region.

6. The transflective liquid crystal display panel as described in claim 1, wherein the first common electrode layer and the second common electrode layer have the same electrical potential.

7. The transflective liquid crystal display panel as described in claim 1, wherein the liquid crystal layer includes a vertical alignment type liquid crystal located within a single cell gap between the first and second substrates.

8. The transflective liquid crystal display panel as described in claim 1, wherein the liquid crystals in the transmission region having a first refraction change value and a first cell gap value is controlled by a driving voltage.

9. The transflective liquid crystal display panel as described in claim 8, wherein the liquid crystals in the reflective region having a second refraction change value, a second cell gap value, a third refraction change value and a third cell gap value is controlled by the driving voltage.

10. The transflective liquid crystal display panel as described in claim 9, wherein the first cell gap value is approximately equal to the second cell gap value and the third cell gap value.

11. The transflective liquid crystal display panel as described in claim 10, wherein a first total retardation change value of the transmission region is a product of the first refraction change value multiplying the first cell gap value, a second total retardation change value of the reflective region is a product of the second refraction change value multiplying the second cell gap value, a third total retardation change value of the reflective region is a product of the third refraction change value multiplying the third cell gap value, and the sum of the second and third total retardation change values of the reflective region is approximately equal to the first total retardation change value of the transmission region to obtain that the transmittances of both the transmission and reflective regions are substantially equal.

12. A transflective liquid crystal display panel comprising:
a first substrate having a first common electrode layer formed thereon;
a second substrate having a plurality of pixels each divided into a transmission region and a reflective region, at least one pixel electrode layer formed on both of the transmission and reflective regions, the pixel electrode layer including a transparent electrode layer allocated on the transmission region and a reflective electrode layer allocated on the reflective region, a first dielectric layer and a second common electrode layer sequentially overlapping over the pixel electrode layer, the second common electrode layer of the reflective region having a plurality of apertures exposing the pixel electrode layer, wherein each of the apertures has a specific width and an aperture interval is formed between each two of the apertures whereby a specific ratio of the aperture width to the aperture interval in structural allocation can be determined from 0.1 to 10; and
a liquid crystal layer having liquid crystals within a cell gap between the first and second substrates, wherein the first common electrode layer and the second common electrode layer face to the liquid crystal layer.

13. The transflective liquid crystal display panel as described in claim 12, further comprises a color filter layer formed between the first substrate and the first common electrode.

14. The transflective liquid crystal display panel as described in claim 12, wherein the second substrate includes a thin film transistor array substrate having at least one thin film transistor.

15. The transflective liquid crystal display panel as described in claim 12, wherein each of the apertures has the specific width and the aperture interval is formed between each two of the apertures so that the specific ratio of the aperture width to the aperture interval in structural allocation can be determined to respectively induce different electric field directions for the liquid crystals controlled by the transmission region and a reflective region under the same driving voltage to render different tilt angle of the liquid crystals controlled by the reflective region from tilt angle of the liquid crystals controlled by the transmission region but consistence of the transmittances on both of the transmission region and a reflective region.

16. The transflective liquid crystal display panel as described in claim 12, wherein the second common electrode layer is extended to surround the transmission region.

17. The transflective liquid crystal display panel as described in claim 12, wherein the first common electrode layer and the second common electrode layer have the same electrical potential.

18. The transflective liquid crystal display panel as described in claim 15, wherein the liquid crystals in the transmission region having a first refraction change value and a first cell gap value is controlled by a driving voltage.

19. The transflective liquid crystal display panel as described in claim 18, wherein the liquid crystals in the reflective region having a second refraction change value, a second cell gap value, a third refraction change value and a third cell gap value is controlled by the driving voltage.

20. The transflective liquid crystal display panel as described in claim 19, wherein the first cell gap value is approximately equal to the second cell gap value and the third cell gap value.

21. The transflective liquid crystal display panel as described in claim 20, wherein a first total retardation change value of the transmission region is a product of the first refraction change value multiplying the first cell gap value, a second total retardation change value of the reflective region is a product of the second refraction change value multiplying the second cell gap value, a third total retardation change value of the reflective region is a product of the third refraction change value multiplying the third cell gap value, and the sum of the second and third total retardation change values of the reflective region is approximately equal to the first total retardation change value of the transmission region to obtain that the transmittances of both the transmission and reflective regions are substantially equal.

22. The transflective liquid crystal display panel as described in claim 12, wherein the pixel electrode layer includes a transparent electrode layer allocated on the transmission region and a reflective electrode layer allocated on the reflective region.

23. The transflective liquid crystal display panel as described in claim 12, wherein the second common electrode layer includes a transparent electrode layer.

24. The transflective liquid crystal display panel as described in claim 14, wherein the pixel electrode layer is electrically connected to a drain of the thin film transistor.

* * * * *